United States Patent
Albizua Macua et al.

(10) Patent No.: US 11,560,877 B2
(45) Date of Patent: Jan. 24, 2023

(54) SHAFT-TO-SHAFT CONNECTOR FOR A WIND TURBINE

(71) Applicant: Siemens Gamesa Renewable Energy Innovation & Technology S.L., Sarriguren (ES)

(72) Inventors: Juan Albizua Macua, Pamplona (ES); Hugo De Carlos Alegre, Pamplona (ES); Mickaël Durand, Gorraiz (ES); Roberto Repiso Barrera, Donostia (ES)

(73) Assignee: SIEMENS GAMESA RENEWABLE ENERGY INNOVATION & TECHNOLOGY S.L

( * ) Notice: Subject to any disclaimer, the term of this patent is extended or adjusted under 35 U.S.C. 154(b) by 167 days.

(21) Appl. No.: 16/837,514

(22) Filed: Apr. 1, 2020

(65) Prior Publication Data
US 2020/0318617 A1    Oct. 8, 2020

(30) Foreign Application Priority Data
Apr. 8, 2019 (EP) .................................... 19380006

(51) Int. Cl.
*F03D 15/00* (2016.01)
*F03D 9/25* (2016.01)
*F03D 80/80* (2016.01)

(52) U.S. Cl.
CPC ............... *F03D 15/00* (2016.05); *F03D 9/25* (2016.05); *F03D 80/88* (2016.05); *F05B 2240/60* (2013.01); *F16C 2360/31* (2013.01)

(58) Field of Classification Search
CPC . F03D 15/00; F03D 9/25; F03D 80/88; F03D 13/20; F03D 1/0658; F03D 13/00;
(Continued)

(56) References Cited

U.S. PATENT DOCUMENTS

2012/0093578 A1* 4/2012 Redin Miqueleiz .... F16D 1/076
403/335
2012/0131786 A1    5/2012 Neumann
(Continued)

FOREIGN PATENT DOCUMENTS

KR    20140042555 A    4/2014
WO    2012052022 A1    4/2012

OTHER PUBLICATIONS

European Search Report dated Oct. 14, 2019 for Application No. 19380006.7.

*Primary Examiner* — Aaron R Eastman
(74) *Attorney, Agent, or Firm* — Schmeiser, Olsen & Watts LLP

(57) ABSTRACT

Provided is a wind turbine including: a tower, a nacelle mounted on the tower, an electrical generator housed in the nacelle, a wind rotor rotatably coupled to the nacelle for rotating about a rotational axis and having at least one rotatable blade, two rotating shafts for connecting the wind rotor to the electrical generator, a shaft connector for rigidly connecting the two rotating shafts. The shaft connector includes: a hollow body, at least an inner flange protruding from the hollow body towards an axis of rotation of the shaft connector, the inner flange being connectable to one of the two rotating shafts, at least one hole provided on the hollow body for accessing the inner flange.

14 Claims, 3 Drawing Sheets

(58) Field of Classification Search
CPC .. F03D 80/00; F05B 2240/60; F05B 2230/80; F05B 2240/61; F16C 2360/31; Y02E 10/72; Y02E 10/728; Y02P 70/50
See application file for complete search history.

(56) References Cited

U.S. PATENT DOCUMENTS

| | | | | |
|---|---|---|---|---|
| 2013/0183162 | A1* | 7/2013 | Gruden | F03D 80/00 416/244 R |
| 2013/0270837 | A1* | 10/2013 | Mongeau | F03D 80/70 290/1 C |
| 2015/0135534 | A1* | 5/2015 | Viscome | F03D 13/10 29/889 |
| 2018/0313329 | A1* | 11/2018 | Vanderwalker | F03D 80/50 |
| 2018/0313330 | A1* | 11/2018 | Vanderwalker | F03D 80/50 |
| 2018/0313331 | A1* | 11/2018 | Vanderwalker | F03D 13/10 |
| 2019/0277254 | A1* | 9/2019 | Larsen | F03D 7/0244 |
| 2021/0095725 | A1* | 4/2021 | Rogg | F03D 15/00 |
| 2021/0285422 | A1* | 9/2021 | Liingaard | F03D 80/70 |

* cited by examiner

SHAFT-TO-SHAFT CONNECTOR FOR A WIND TURBINE

CROSS-REFERENCE TO RELATED APPLICATIONS

This application claims priority to EP Application No. 19380006.7, having a filing date of Apr. 8, 2019, the entire contents of which are hereby incorporated by reference.

FIELD OF TECHNOLOGY

The following relates to a shaft-to-shaft connector for connecting two shafts in a wind turbine. More particularly embodiments of the present invention relates to a connector for connecting the main rotor shaft of a wind turbine to the gearbox provided between the main rotor shaft and the electrical generator of the wind turbine.

BACKGROUND

In the above defined technical field there is the technical problem of transmitting load between the main rotor shaft connected to the wind rotor including the blades, also known as low speed shaft, to the gearbox provided in the nacelle, between the wind rotor and the electrical generator.

The most used technology for this purpose is based on shrink discs. By such components, enough friction force to transmit torque is generated between the main shaft and the gearbox. The low speed shaft is generally inserted with tighter mating tolerances in a hollow section of the gearbox, typically called a hollow shaft.

Shrink discs consist or comprise of one inner ring and one outer ring, with corresponding conical surfaces. By axially moving the outer ring against the inner ring the outer ring will be pushed outwards and the inner ring will be pushed inwards. This axial movement of the outer ring against the inner ring may be done mechanically or hydraulically. The pressure between shaft and hub, created by this displacement, can be used to transmit a torque or an axial load, by using the friction between the two contact faces.

Due to the above described basic arrangement a large and heavy main shaft, gearbox, and hollow shaft are required, thus heavy and large drive trains and therefore heavy and large wind turbines are obtained. Additionally, despite shrink discs can be removed, tighter mating tolerances between shaft and gearbox usually leads to scratches and damaged components.

SUMMARY

An aspect relates to provide a new connector for connecting the main rotor shaft of a wind turbine to the gearbox, in order to minimize the above described inconveniences of the conventional art.

According to embodiments of the invention, there is provided a wind turbine including a tower, a nacelle mounted on the tower, an electrical generator housed in the nacelle, a wind rotor rotatably coupled to the nacelle for rotating about a rotational axis and having at least one rotatable blade, two rotating shafts for connecting the wind rotor to the electrical generator and a shaft connector for rigidly connecting the two rotating shafts. The shaft connector comprises a hollow body, at least an inner flange protruding from the hollow body towards an axis of rotation of the shaft connector, the inner flange being connectable to one of the two rotating shafts and at least one hole provided on the hollow body for accessing the inner flange.

In particular, the two rotating shafts may include a rotor shaft connected to the wind rotor or an input shaft of a gearbox interposed between the wind rotor and the electrical generator.

The flange connection of embodiments of the present invention and the possibility to easily access through the hole(s) provided on the body of the shaft connector offer a plurality of advantages, including:

reducing of the shaft and gearbox weight and length, therefore reducing the drive train and the wind turbine length and weight;

avoiding the use of pressure forces for transmitting torque from wind rotor to gearbox;

making easier inspection and maintenance through holes of the flanged shaft connector. Different number and dimensions of the holes can be provide depending on the specific application embodiment, in particular depending on the tools dimensions being used during mounting, inspection and maintenance.

According to embodiments of the invention, the shaft connector further comprises a second outer flange protruding from the hollow body outwards with respect to the axis of rotation, the outer flange being connectable to the other of the two rotating shafts. Advantageously, this permits avoiding the use of a gearbox hollow shaft, which is a complex manufacturing component. According to other embodiments of the invention, the second flange may be an inner flange, accessible through the hole(s) provided on the body of the shaft connector.

According to embodiments of the invention, the hollow body may be cylindrical, the axis of rotation being the geometric axis of the the hollow body. The access holes may be provided on a lateral wall of the hollow body. The inner flange is provided at one base of the cylindrical hollow body and the second flange is provided at the other base of the cylindrical hollow body.

According to embodiments of the invention, the inner flange and the second flange are removably connectable to the respective rotating shafts by a respective plurality of bolts or a respective plurality of shear pins. Advantageously, if the connection between shaft connector and the gearbox is a bolted or pinned connection the risk of damaging components when assembling and disassembling are avoided, thanks to the easiness of inspection and access.

According to embodiments of the invention, the shaft connector comprises at least one strain measurement device for determining loads transmitted between the two rotating shafts. The regular geometry of the cylindrical hollow body makes it particularly easy to install a strain measurement system which allows to obtain loads coming into the gearbox. These measurements can be used by the wind turbine health monitoring system.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention are not limited.

BRIEF DESCRIPTION

Some of the embodiments will be described in detail, with reference to the following figures, wherein like designations denote like members, wherein.

DETAILED DESCRIPTION

Figure 1:
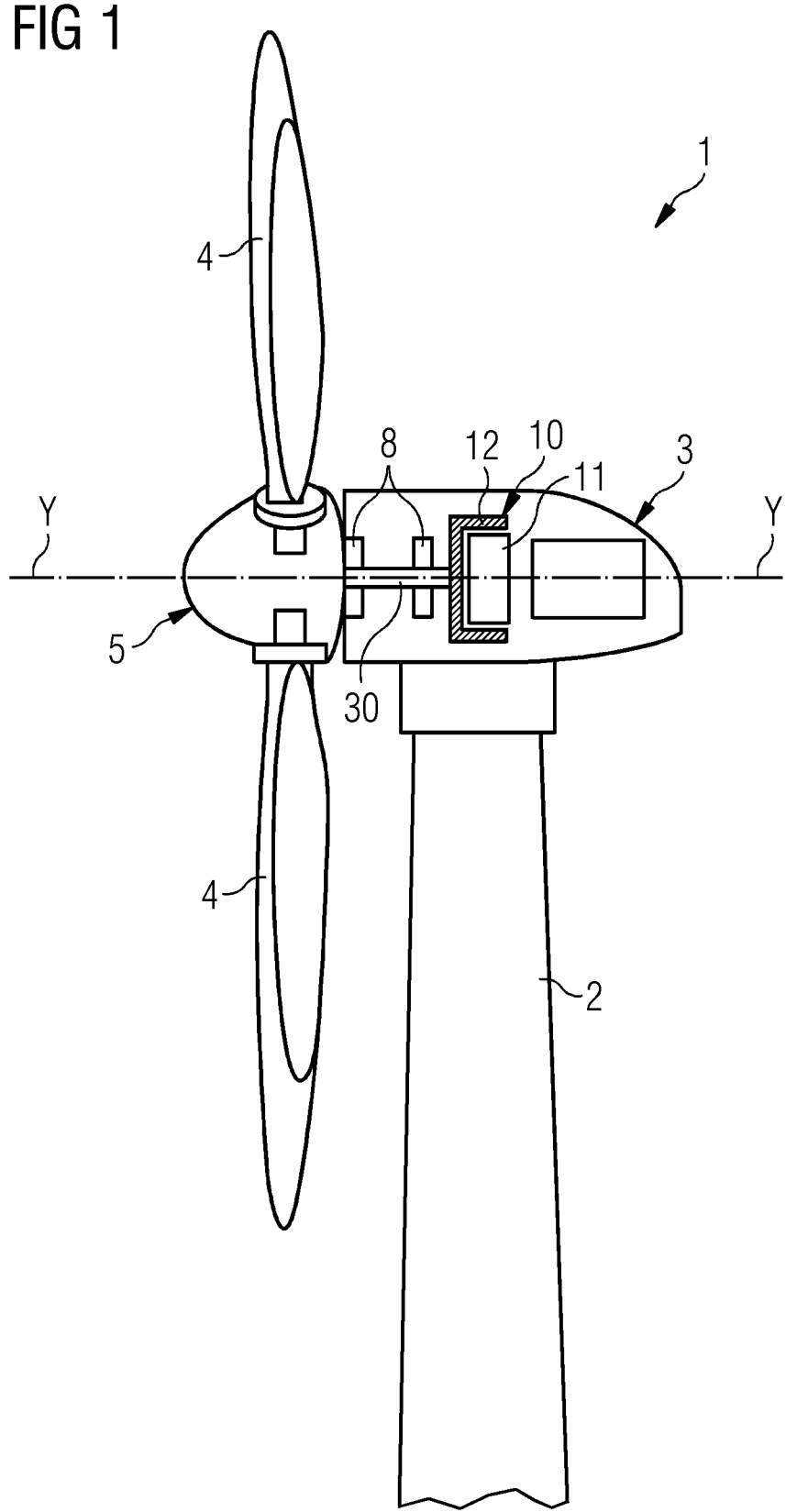
FIG. 1 shows a schematic section of a wind turbine.
Figure 2:
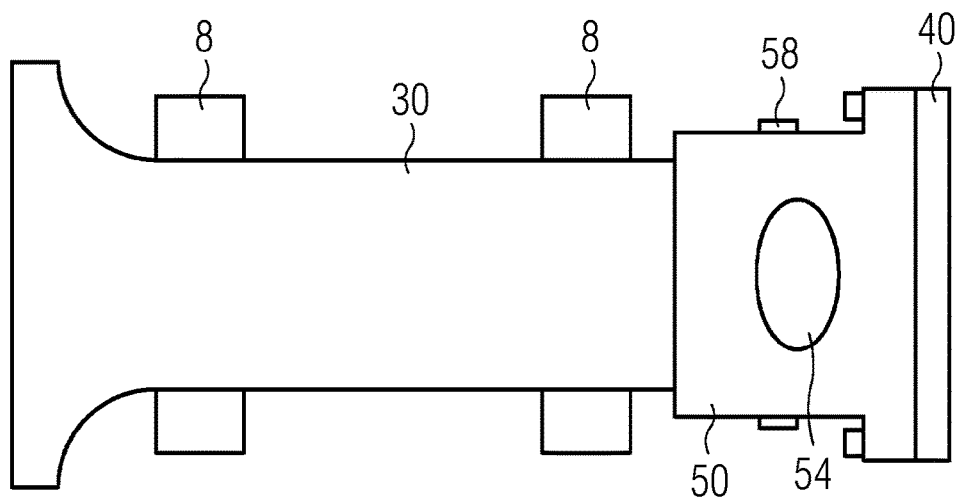
FIG. 2 shows a lateral view of a flanged connection for a wind turbine obtained with the present invention.
Figure 3:
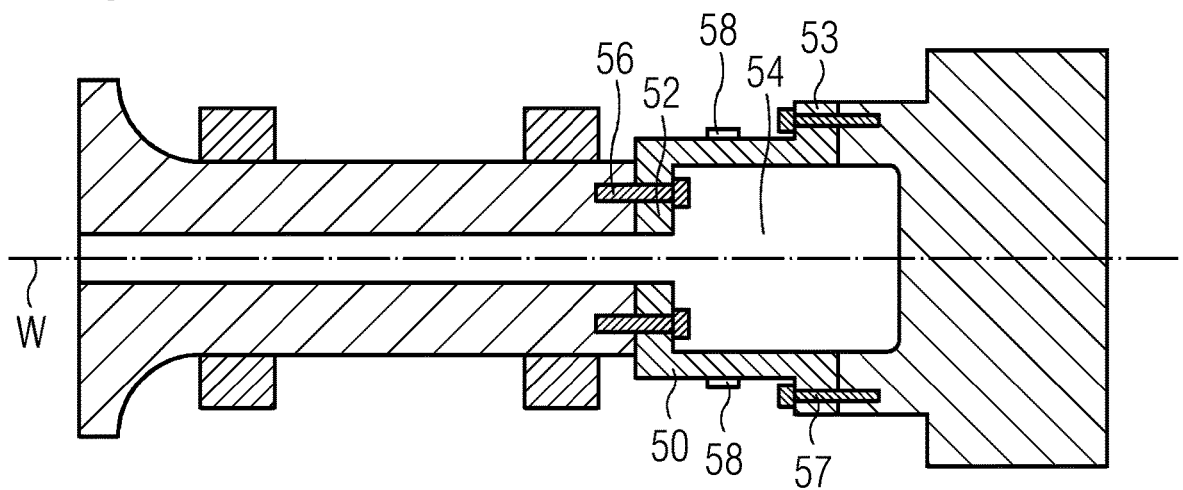
FIG. 3 shows a sectional view of a flanged connection of FIG. 2.
Figure 4:
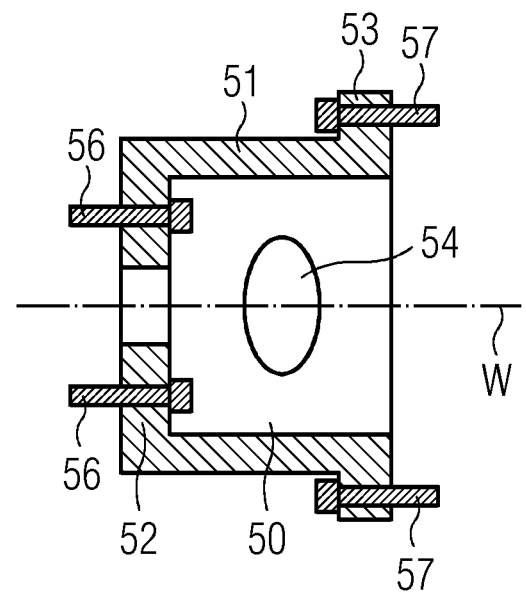
FIG. 4 shows a more detailed view of the flanged connection of FIG. 2.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted foundation. A nacelle 3 is arranged on top of the tower 2. In between the tower 2 and the nacelle 3 a yaw angle adjustment device (not shown) is provided, which is capable of rotating the nacelle around a vertical yaw axis. The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y.

The blades 4 extend radially with respect to the rotational axis Y. The wind turbine 1 comprises an electrical generator 10. The wind rotor 5 is rotationally coupled with the electrical generator 10 by means of a rotatable main shaft 30 and a gearbox (not shown in FIG. 1). A schematically depicted bearing assembly 8 is provided in order to hold in place the main shaft 30. The rotatable main shaft 30 extends along the rotational axis Y. The permanent magnet electrical generator 10 includes a stator 11 and a rotor 12. The rotor 12 is radially external to the stator 11 and is rotatable with respect to the stator 11 about the rotational axis Y. According to other embodiments of the present invention (not shown) the rotor is radially internal to the stator 11. The gearbox transfer torque from the rotatable main shaft 30 to the rotor 12, which are rotating at different rotational speeds. The rotor 12 is normally rotating at a higher speed than the rotatable main shaft 30, which may be also referred to as a low speed shaft.

With reference to FIGS. 2 to 5, the gearbox interposed between the main shaft 30 and the rotor 12 of the electrical generator 10 includes a gearbox input shaft 40. The main shaft 30 and the gearbox input shaft 40 are rigidly connecting to each other through a shaft connector 50. In operation the shaft connector 50 rotates around an axis of rotation W, which may be parallel or aligned to the rotational axis Y. The shaft connector 50 comprises a hollow body 51 having a central cavity and at least an inner flange 52 protruding from the hollow body 51 towards the axis of rotation W. The inner flange is removably connectable to the main shaft 30 by means of a first plurality of removable connections 56. The removable connections 56 may be bolts or shear pins or similar mechanical elements coupled through respective pluralities of coupling holes provide on the main shaft 30 and on the inner flange 52. According to an embodiment of the invention (not shown) the inner flange is removably connectable to the gearbox input shaft 40. At least one access hole 54 is provided on the hollow body 51 for accessing the inner cavity and through this the inner flange 52. According to embodiments of the present invention, a plurality of holes 54 may be provided on the hollow body 51 for accessing the inner cavity and through this the inner flange 52. The plurality of holes may be regularly distributed around the axis of rotation W. In the embodiments where the hollow body 51 is cylindrical the one or more access holes 54 are provided on a lateral cylindrical wall of the hollow body 51. The access hole(s) 54 permit access to the inner flange 52 and the removable connections 56 for mounting, inspection and maintenance. The position and dimensions of the access hole(s) 54 depend on the tools dimensions being used during mounting, inspection and maintenance.

On the shaft connector 50 at least one strain measurement device 58 may be installed. In particular, at least one strain measurement device 58 may be installed on a surface of the hollow body 51. By post-processing the signal outputted by strain measurement device 58, loads that go from the main shaft 30 to the gearbox input shaft 40 may be calculated.

The shaft connector 50 comprises a second outer flange 53 protruding from the hollow body 51 outwards with respect to the axis of rotation W. The second outer flange 53 is removably connectable to the the gearbox input shaft 40 by means of a second plurality of removable connections 57. The removable connections 57 may be bolts or shear pins or similar mechanical elements coupled through respective pluralities of coupling holes provide on the gearbox input shaft 40 and on the second outer flange 53. In the embodiment of the invention where the inner flange 52 is removably connectable to the gearbox input shaft 40, the second outer flange 53 is removably connectable to the the main shaft 30.

Figure 5:
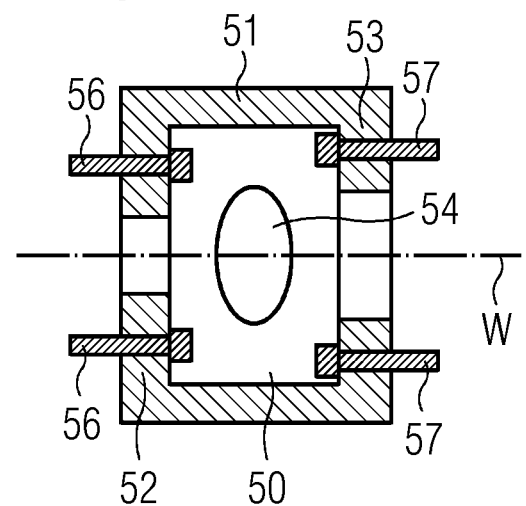
FIG. 5 shows a second embodiment of a flanged connection for a wind turbine obtained with the present invention.

According to an embodiment of the invention shown in FIG. 5, the second flange 53 is also an inner flange protruding from the hollow body 51 towards the axis of rotation W in such embodiment the access hole(s) 54 permit to access both the two inner flanges and the respective removable connections 56, 57 for mounting, inspection and maintenance.

The hollow body 51 may be cylindrical, the axis of rotation W being the geometric axis of the the hollow body 51. The inner flange 52 may be provided at one base of the cylindrical hollow body 51 and the second outer flange 53 may be provided at the other base of the cylindrical hollow body 51.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine including:
   a tower,
   a nacelle mounted on the tower,
   an electrical generator housed in the nacelle, a wind rotor rotatably coupled to the nacelle for rotating about a rotational axis and having at least one rotatable blade,
   two rotating shafts for connecting the wind rotor to the electrical generator,
   a shaft connector for rigidly connecting the two rotating shafts,
   wherein the shaft connector is integrally formed by a hollow body and a first flange, wherein the first flange is an inner flange protruding towards an axis of rotation of the shaft connector, the inner flange being connectable to one of the two rotating shafts, by means of a respective plurality of removable connections, and wherein the hollow body includes at least one access hole for accessing the inner flange and the respective plurality of removable connections for mounting and/or maintenance while the inner flange is in position to be connected to the one of the two rotating shafts.

2. The wind turbine as claimed in claim 1, wherein the shaft connector is further integrally formed by a second flange connectable to the other of the two rotating shafts.

3. The wind turbine as claimed in claim 2, wherein the second flange is an outer flange protruding outwards with respect to the axis of rotation.

4. The wind turbine as claimed in claim 1, wherein the hollow body is cylindrical, the axis of rotation being the geometric axis of the hollow body.

5. The wind turbine as claimed in claim 4, wherein the at least one access hole is provided on a lateral wall of the hollow body.

6. The wind turbine as claimed in claim 4, wherein the inner flange is integrally formed at a first base of the cylindrical hollow body and a second flange is integrally formed at a second base of the cylindrical hollow body.

7. The wind turbine as claimed in claim 1, wherein the inner flange is removably connectable to one of the two rotating shafts.

8. The wind turbine as claimed in claim 7, wherein a second flange is removably connectable to the other of the two rotating shafts.

9. The wind turbine as claimed in claim 8, wherein the inner flange and the second flange are removably connectable to the respective rotating shafts by a respective plurality of bolts or a respective plurality of shear pins.

10. The wind turbine as claimed in claim 1, wherein the two rotating shafts include a rotor shaft connected to the wind rotor and an input shaft of a gearbox interposed between the wind rotor and the electrical generator.

11. The wind turbine as claimed in claim 1, wherein the shaft connector comprises at least one strain measurement device for determining loads transmitted between the two rotating shafts.

12. The wind turbine as claimed in claim 11, wherein the at least one strain measurement device is installed on a surface of the hollow body.

13. A wind turbine comprising:
a rotor;
an electrical generator;
a first rotating shaft and a second rotating shaft; and
a shaft connector for rigidly connecting the first rotating shaft and the second rotating shaft;
wherein the shaft connector is a single component including a hollow body, a first flange at a first end of the hollow body, and a second flange at a second end of the hollow body;
wherein the first flange is an inner flange protruding towards an axis of rotation of the shaft connector;
wherein the first flange is connected to the first rotating shaft by a first plurality of removable connections;
wherein the second flange is connected to the second rotating shaft by a second plurality of removable connections; and
wherein the hollow body includes at least one access hole for accessing the first flange and the first plurality of removable connections for mounting and/or maintenance while the first flange is connected to the first rotating shaft and the second flange is connected to the second rotating shaft.

14. A shaft connector for connecting a first rotating shaft and a second rotating shaft, the shaft connector comprising:
a hollow body, a first flange at a first end of the hollow body, and a second flange at a second end of the hollow body, wherein the hollow body, the first flange, and the second flange are formed as a single component;
wherein the first flange is an inner flange protruding towards an axis of rotation of the shaft connector;
wherein the first flange is connected to the first rotating shaft by a first plurality of removable connections;
wherein the second flange is connected to the second rotating shaft by a second plurality of removable connections; and
wherein the hollow body includes at least one access hole for accessing the first flange and the first plurality of removable connections for mounting and/or maintenance while the first flange is connected to the first rotating shaft and the second flange is connected to the second rotating shaft.

* * * * *